United States Patent [19]

Sweeney et al.

[11] 4,377,649

[45] Mar. 22, 1983

[54] WAX COMPOSITIONS

[75] Inventors: Nevin J. Sweeney, St. Clair; Kenneth C. Seale, Dural, both of Australia

[73] Assignee: K. H. Freeman Pty. Ltd., Australia

[21] Appl. No.: 286,023

[22] Filed: Jul. 22, 1981

[30] Foreign Application Priority Data

Jul. 22, 1980 [AU] Australia ............................ PE4632

[51] Int. Cl.$^3$ .............................................. C08L 3/02
[52] U.S. Cl. ..................................... 524/49; 156/328; 428/486
[58] Field of Search ....................... 524/48, 49, 51, 52, 524/53, 276, 475

[56] References Cited

U.S. PATENT DOCUMENTS 4,255,485  3/1981  Yau ...................................... 428/288

Primary Examiner—Paul R. Michl
Attorney, Agent, or Firm—Ostrolenk, Faber, Gerb & Soffen

[57] ABSTRACT

A wax composition has water repellent and adhesive properties, is cheap and has wide application in the manufacture and treatment of corrugated paperboard, fibreboard, particle board and other cellulosic materials. The liquid composition comprises 1–50 wt % of a wax, 1–30 wt % of a starch and 1–50 wt % of a formaldehyde based resin.

6 Claims, No Drawings

WAX COMPOSITIONS

FIELD OF THE INVENTION

The present invention relates to a composition comprising a wax, a starch and a formaldehyde-based resin. The composition is particularly suitable for the treatment of cellulose fibre products, such as paper, paperboard, corrugated paperboard, hardboard, fibreboard and particle board (i.e. so-called chipboard), to improve their properties. However, the composition may also be used in many other applications where previously waxes or resins were used.

BACKGROUND OF THE INVENTION

Although cellulose fibre based products are cheap and readily available, a principal disadvantage for a number of uses is that they readily absorb water and so lose strength. It is known to coat or impregnate such products with hydrophobic materials to reduce or prevent water uptake. In particular, waxes have been used to coat or impregnate paper and corrugated cardboard to impart a degree of water and grease resistance and improved strength. However, the waxes normally used are derived from petroleum and are therefore becoming much more expensive as the price of crude oil increases.

Resins have also been used to modify the properties of cellulose fibre based products. Paper, usually printed with a decorative pattern, is impregnated with a resin (usually a melamine resin) in the production of films or foils for lamination to a substrate, such as particle board. These laminated boards find wide application in kitchens and for the production of furniture having a hard decorative outer surface. The increasing cost of timber has made such laminated products very attractive, however the cost of the resin represents a substantial part of the overall cost of the laminated product.

Starches have been used for a long time for sizing paper products. However, although starches are naturally occurring products not subject to price increases based on escalating crude oil prices, they are unable to impart the required water resistance properties to cellulose fibre based materials.

It is an object of the present invention to mitigate these disadvantages and to provide a composition which may be used in place of waxes or resins in the treatment of cellulose fibre based materials.

SUMMARY OF THE INVENTION

The present invention provides a composition for use in the manufacture of cellulose fibre materials, which comprises
(a) from 1 to 50 wt % of a wax,
(b) from 1 to 30 wt % of a starch,
(c) from 1 to 50 wt % of a formaldehyde based resin and
(d) a liquid carrier.

The waxes may include macrocrystalline, microcrystalline, mineral waxes, synthetic waxes and natural waxes (e.g. vegetable, animal, and insect derived waxes). The waxes may be in fully-refined, semi-refined or crude form. Generally, the waxes will be in the form of slurries or suspensions in the liquid carrier and suitable emulsifying or suspending agents would be included as appropriate. Alternatively, the waxes may be dissolved in the liquid carrier.

The starch will generally be in the form of a starch slurry, but starch in the dry powder form may also be used to make up the composition. The starch may be chemically modified or unmodified. Modified starches include those which have been treated with alkali or starches which have been borated with borax. The starch may be ungelled or pregelled. Being relatively cheap, the inclusion of a proportion of starch in the composition reduces the cost of the composition without detracting from its overall properties. In addition, the inclusion of starch imparts useful adhesive properties to the composition, which may be useful in the lamination of sheet materials.

The formaldehyde based resin will be selected from those formaldehyde based resins well known in the art, for example urea-formaldehyde, phenol-formaldehyde, melamine-formaldehyde and tannin-formaldehyde resins.

Generally, the liquid carrier will be water and the wax, starch and resin components will be suspended therein, if necessary by the use of suitable suspending or emulsifying agents. However, non-aqueous liquid carriers or mixtures of aqueous and non-aqueous liquids may also be used.

The composition may also include other additives according to its specific application. Such additives include homopolymers and copolymers such as polyethylene, ethylene vinyl acetate (EVA), polyvinyl acetate (PVA), polyvinyl chloride (PVC), hydrocarbon resins, wood resins, acrylic resins, and polyvinylalcohols. Plasticisers may also be included.

The composition may also include fillers such as mica, carbonate, clays, flours, talc or silica.

The properties of the individual ingredients have been found to complement one another and to provide a composition for the treatment of cellulose materials which finds many uses and which is relatively economical. By varying the relative proportion of the components, the composition may be adapted to a wide variety of uses in the treatment of cellulose products.

One of the principal uses for which the composition of the present invention was developed is the production of corrugated paperboard. As mentioned earlier, waxes and wax emulsions have been used for many years in the coating, laminating and impregnation of fibreboard and other cellulosic materials to give particular desirable qualities (for example water resistance, grease resistance, improved strength, and improved flowability). The waxes have generally been added to the basic raw materials or to the finished products. The waxes may be applied as coatings by roller coating or spray coating techniques. Alternatively, the product may be impregnated by immersion, spray or cascade methods. Corregated fibreboard cartons for juices, fruit, vegetable, meat, poultry and fish have been waxed to enable dry, moist or wet products to be placed in the cartons. The wax treatment allows the cartons to be stored on pallets under high humidity conditions without danger of the cartons collapsing.

However, such waxed corrugated fibreboard cartons have often been produced by post-impregnation techniques. Such impregnation techniques are costly and use large quantities of wax since the voids in the corrugated fibreboard tend to become filled with wax. This is wasteful. The composition of the present invention allows in-line treatment of the various layers of the corrugated fibreboard during production. This is facilitated by the adhesive properties of the composition of the present invention, which allows high in-line lamination speeds to be achieved.

Corrugated fibreboard comprises a corrugated medium sandwiched between two plain liners (the so-called single face and double back liners). Improved rigidity may be achieved by using a so-called duo-arch medium, wherein two mediums are laminated together under heat and pressure before the outer liners are applied. The composition of the present invention has adhesive properties which enable the lamination of the two medium papers and also imparts excellent water resistance to the system whilst using a minimum amount of the composition. Thus, the corrugated paperboard may be produced continuously at high production speeds with the use of a minimum of the composition but producing a corrugated paperboard of excellent water resistant properties. In general, water and humidity resistance should include splash resistance, reduced water uptake, reduced moisture vapor transmission ratio, increased strength retention, and improved COBB test results (a test for water impermeability which measures water uptake).

Should it be desirable in particular instances, the paper treated with the composition of the present invention may have a further application of a conventional wax. However, the pretreatment using the composition of the present invention enables the wax pick-up to be reduced and thereby minimises the amount of expensive wax employed.

In summary, the composition of the present invention is particularly useful in the following stages of corrugated board manufacture
 (a) In-line impregnation of mediums prior to lamination to provide a duo-arch medium. Lamination may be achieved by means of the adhesive properties of the composition which also imparts humidity resistance and additional rigidity to the duo-arch medium.
 (b) When a single medium is used, the composition may be used to provide in-line coatings or impregnation of the medium so as to impart increased rigidity, increased water and humidity resistance, and reduced wax pick-up in subsequent processes.
 (c) The composition may be used to provide for in-line coatings or impregnation of single face liners to provide increased water and humidity resistance, improved slip and anti-skid properties, improved scuff resistance, and reduced wax pick-up in subsequent wax treatments.
 (d) The composition may also be used for in-line coatings or impregnation of double back liners to provide improved water and humidity resistance, improved slip and anti-skid properties, improved scuff resistance, improved external appearance, and reduced wax pick-up during subsequent impregnation.

The composition of the present invention may also be applied to the finished corrugated fibreboard so as to provide improved water and humidity resistance. Such treatments would include full immersion impregnations, roller coatings, curtain coatings, cascade coatings, and spray coatings.

The composition may also be formulated for inclusion in the paper during production thereof.

The composition finds wide application in a variety of uses relating to cellulosic materials. The composition may be employed as a glue or glue additive in the production of particle board or fibreboard, which are produced by the application of heat and pressure to wood chips or wood fibres. The product is cheap, adhesive and imparts good water resistance properties to the produced board. The board also has improved lubrication properties, which facilitate subsequent working of the board.

It is well known to provide particle board with an external plastics laminate coating. Generally, the plastics laminate is produced by impregnating a paper with a resin, usually a melamine resin. The finished products are generally referred to as high pressure melamine laminates and low pressure melamine decorative boards. The paper used to produce the films or foils for lamination to the substrate is impregnated with the resin and subsequently treated under heat and pressure. Typically, the resins have amounted to 50 to 200% of the weight of the paper. The composition of the present invention may be used to preimpregnate or precoat the paper so as to reduce the subsequent pick-up of resin, without affecting the quality of the finished plastic laminate. The composition of the present invention is compatable with the normally used melamine resins and thereby allows the cost of the product to be reduced without affecting its properties.

It has also been found that the properties of the composition of the present invention enable it to find application in other fields. For example, the composition may be incorporated into cements and concretes to enhance pumpability, inhibit bleeding of water during setting and to reduce the permeability of the set product. Also, the composition may be used for sizing, softening and lubrication of textiles and textile threads.

DESCRIPTION OF PREFERRED EMBODIMENTS

Embodiments of the present invention will now be described with reference to the following illustrative examples.

EXAMPLE 1

A water-based formulation was developed for laminating two corrugated mediums in the production of corrugated paperboard and consisted of the following components expressed as weight percentages.

| | Components | Solids Range | Typical Solids |
|---|---|---|---|
| Macrocrystalline wax emulsion (45% solids) | 37.8 | 13–32 | 17 |
| Pregelled starch slurry (40% solids) | 52 | 8–24 | 21 |
| UF resin suspension (65% solids) | 5 | 1–13 | 3 |
| Acrylic emulsion (50% solids) | 5 | 0.1–5 | 2 |
| Starch modifier | 0.2 | 0–2 | 0.2 |

The starch modifier (for example, borax) acts to increase the viscosity of the formulation, and also acts as a tackifier to decrease the starch set time to allow for high production speeds.

This produces a product which is suitable for laminating two medium papers together in a single operation under heat and pressure to give a resultant duo-system which has greatly improved water resistance and strength. In particular this product can be used in in-line production of duo-arch corrugated board. This board may be made into cartons with superior strength and water resistance, especially if the liners thereof are coated with products as in Example 4 below.

The wax provides water resistance and rigidity. The starch acts as a adhesive. The UF resin and catalyst provide water resistance and strength. The acrylic resin acts as a tackifier.

EXAMPLE 2

The following water-based formulation was developed for in-line treatment of the medium to increase wet and dry strength, and included the following components expressed as weight percentages:

|  | Components | Solids Range | Typical Solids |
| --- | --- | --- | --- |
| Macrocrystalline wax emulsion (45% solids) | 34 | 11–22 | 17 |
| Dry starch | 1 | 1–5 | 1 |
| UF resin suspension (65% solids) | 64.5 | 33–48 | 30 |
| Catalyst | 0.5 | 0.1–2 | 0.5 |

EXAMPLE 3

A water-based formulation was specifically developed for in-line coating of outside liners (i.e. the liner which would eventually be present on the outside of a produced box) used in the manufacture of corrugated paperboard, and consisted of the following components expressed as weight percentages:

|  | Component | Solids Range | Typical Solids |
| --- | --- | --- | --- |
| Macrocrystalline wax emulsion (45% solids) | 5 | 1–9 | 2 |
| Starch slurry (40% solids) | 10 | 2–8 | 4 |
| UF resin (65% solids) | 69.95 | 32–50 | 45 |
| EVA emulsion (55% solids) | 10 | 0.5–11 | 5 |
| Catalyst | 0.05 | 0.01–0.5 | 0.05 |
| Added Water | 5 | — | — |

The formulation provides increased water hold-out and wet strength and allows the liner to be printed shortly after coating. The small amount of catalyst leads to a slow dry-cure product which cures in 24–48 hours so allowing sufficient time for subsequent printing onto the paperboard.

EXAMPLE 4

A water-based formulation was developed as a non-printable water-resistant coating material, and consisted of the following components expressed as weight percentages:

|  | Component | Solids Range | Typical Solids |
| --- | --- | --- | --- |
| Wax Emulsion (45% solids) | 10 | 1–27 | 4 |
| Ungelled starch slurry (40% solids) | 15 | 2–12 | 6 |
| UF resin and catalyst (65% solids) | 65 | 26–50 | 42 |
| EVA Emulsion (50% solids) | 10 | 2–10 | 5 |

EXAMPLE 5

A water-based microcrystalline wax formulation was developed for precoating or pre-impregnating paper prior to its treatment with resin in the manufacture of foils and films for laminated boards. The pretreatment reduces the amount of resin picked up during production of the foil without detracting from the properties of the foil, thereby reducing use of the expensive resins. The following components were present in the weight percentages given.

|  | Components | Solids Range | Typical Solids |
| --- | --- | --- | --- |
| Microcrystalline wax emulsion (45% solids) | 80 | 4–45 | 36 |
| Starch slurry (40% solids) | 10 | 1–20 | 4 |
| UF resin (65% solids) | 10 | 1–32 | 5 |

EXAMPLE 6

A water-based macrocrystalline wax formulation was developed analogous to that described in Example 5. The following components were present in the weight percentages given.

|  | Components | Solids Range | Typical Solids |
| --- | --- | --- | --- |
| Macrocrystalline wax emulsion (45% solids) | 70 | 4–45 | 31 |
| Ungelled starch slurry (40% solids) | 5 | 1–20 | 2 |
| Melamine formaldehyde resin (50% solids) | 25 | 1–25 | 12 |

EXAMPLE 7

A water-based formulation useful as an additive to glue used for bonding particle board consisted of the following components expressed as weight percentages.

|  | Components | Solids Range | Typical Solids |
| --- | --- | --- | --- |
| Macrocrystalline wax emulsion (50% solids) | 65 | 25–50 | 32.5 |
| Starch slurry (40% solids) | 25 | 1–20 | 10 |
| UF resin (65% solids) | 10 | 1–32 | 6.5 |

This product imparts water-resistance to the surface of the board, and also enhances the subsequent machineability of the board. Generally, the additive would constitute around 10 wt % of the glue.

EXAMPLE 8

A water-based additive for concrete or cement mortars to improve pumpability, inhibit bleeding, reduce permeability, and exhance mortability consisted of the following components expressed as weight percentages.

| Components | Solids Range | Typical Solids |
|---|---|---|
| Wax emulsion (35% solids) | 91 | 10–50 | 32 |
| Pregelled starch (40% solids) | 7 | 1–30 | 3 |
| UF resin (65% solids) | 2 | 1–30 | 1 |

These products may be used to provide a water resistant coating to papers, fibreboard, hardboard, particle boards and other substrates. Other products which may be included in the above formulations are polyvinyl acetate, polyvinyl chloride, EVA and polyethylene emulsions, and polyvinyl alcohol.

The claims defining the invention are as follows:

We claim:

1. A composition for use in the manufacture of cellulosic fibre materials, which comprises
   (a) from 1 to 50 wt % of a wax,
   (b) from 1 to 30 wt % of a starch,
   (c) from 1 to 50 wt % of a formaldehyde based resin, and
   (d) a liquid carrier.

2. A composition according to claim 1, wherein the wax is microcrystalline or macrocrystalline.

3. A composition according to claim 1 or 2, wherein the starch is present in the form of an ungelled or a pregelled slurry.

4. A composition according to claim 1 or 2, wherein the formaldehyde based resin is a melamine-formaldehyde, urea-formaldehyde or phenol-formaldehyde resin.

5. A composition according to claim 1 suitable for laminating paper in the production of corrugated paperboard which comprises
   (a) 13–32 wt % of a wax present in emulsion form
   (b) 8–24 wt % of a starch present in slurry form
   (c) 1–13 wt % of urea-formaldehyde resin, and
   (d) water.

6. A composition according to claim 1 suitable for providing a water resistant coating to cellulosic fibre materials, which comprises
   (a) 1–27 wt % of a wax present in emulsion form,
   (b) 2–12 wt % of a starch present in slurry form,
   (c) 26–50 wt % of a urea-formaldehyde resin,
   (d) 2–10 wt % of ethylene vinyl acetate in emulsion form,
   and
   (e) water.

* * * * *